C. D. MACKAY.
WIRE STAPLING MACHINE.
APPLICATION FILED OCT. 19, 1908.
968,863.
Patented Aug. 30, 1910.
2 SHEETS—SHEET 2.
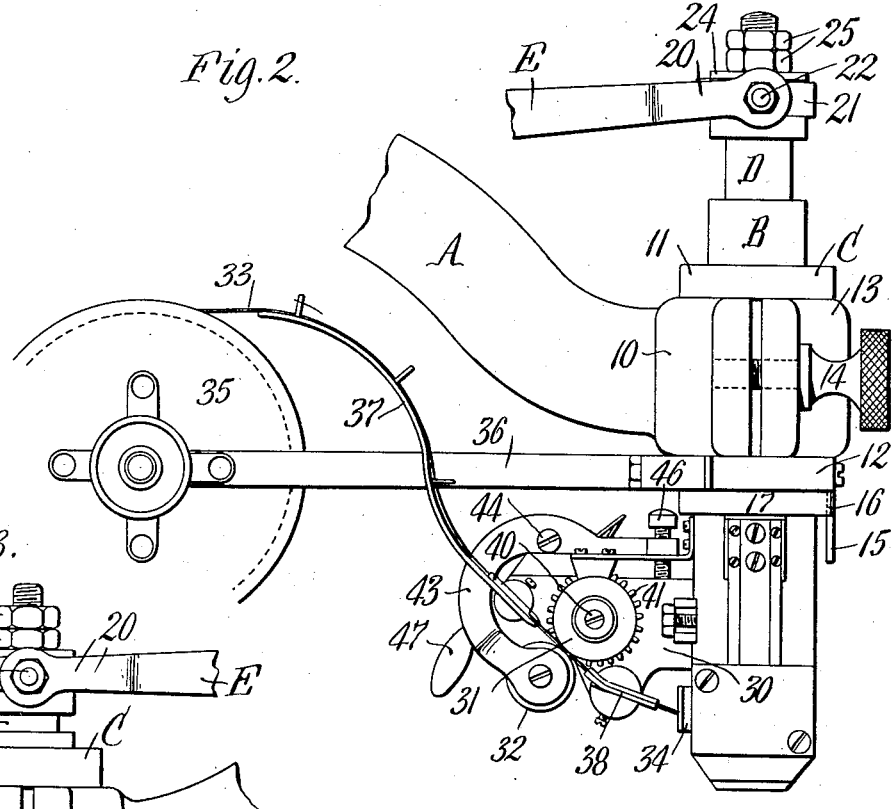
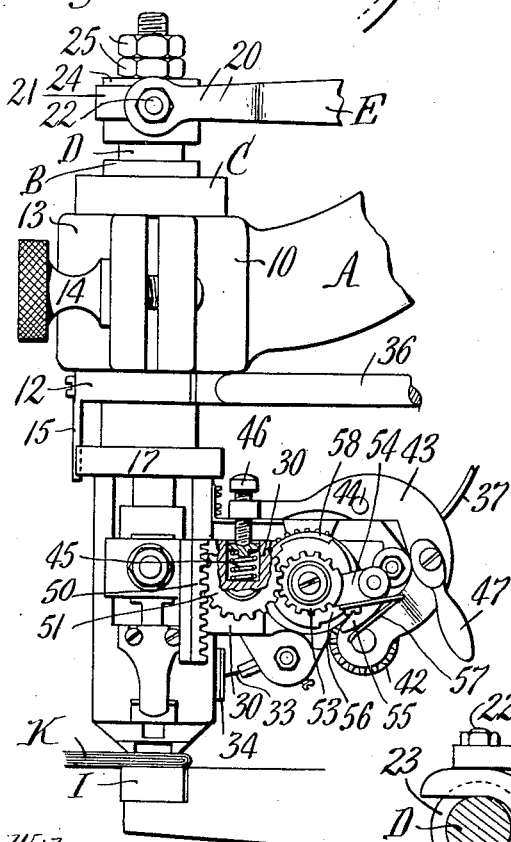
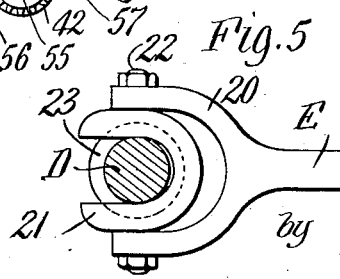
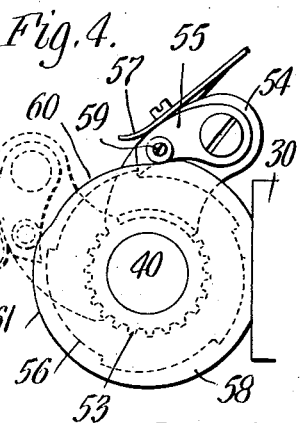
Witnesses:
E. A. Volk
A. G. Dimond
Inventor.
Charles Duncan Mackay,
by Wilhelm, Parker & Hard,
Attorneys.

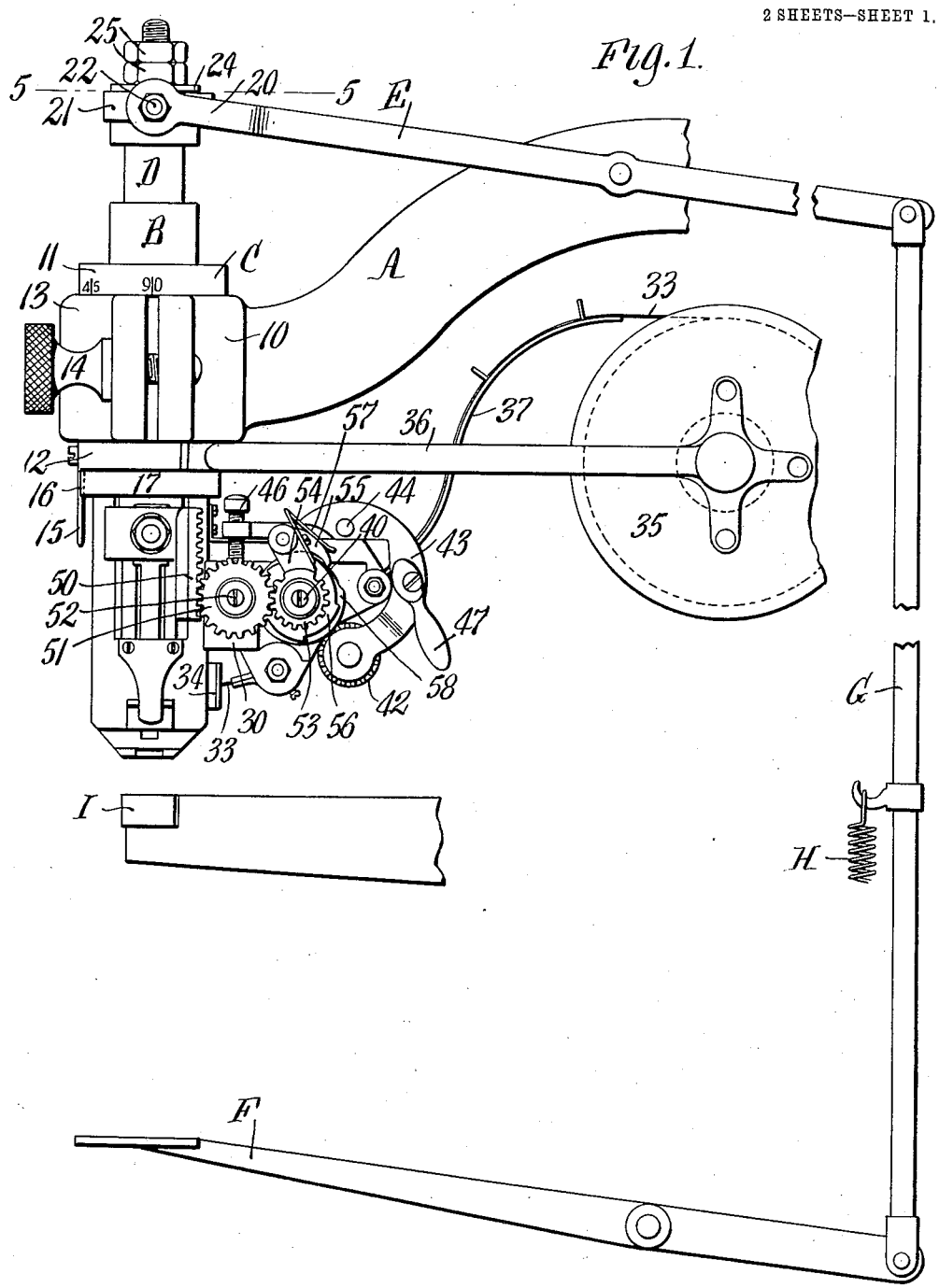

UNITED STATES PATENT OFFICE.

CHARLES DUNCAN MACKAY, OF LONDON, ENGLAND.

WIRE-STAPLING MACHINE.

968,863.   Specification of Letters Patent.   Patented Aug. 30, 1910.

Application filed October 19, 1908. Serial No. 458,344.

*To all whom it may concern:*

Be it known that I, CHARLES DUNCAN MACKAY, a citizen of the United States of America, residing at London, England, have invented a new and useful Improvement in Wire-Stapling Machines, of which the following is a specification.

This invention relates to that class of wire stapling machines which comprise a vertically movable head and a stapling spindle arranged within the head and movable vertically therein, said head and spindle carrying the implements for feeding and cutting the wire and forming, driving and clenching the staples, and being operated, usually by a pedal, in such manner that the head is first lowered upon the work to be stapled, such as a pamphlet or the like, resting upon the anvil, against which it is pressed by the head, and the spindle is then moved down for operating the wire feed mechanism, cutting off the length of wire required for a staple, and forming, driving and clenching the staple.

One object of the invention is to provide the machine with a wire feed mechanism which is actuated from the stapling spindle in such manner that the length of wire required for forming a staple is fed out every time the spindle performs a complete working stroke, although one or more incomplete strokes may have preceded such complete stroke, and so that the wire feed is stopped when the proper length of wire has been fed out, while the spindle is free to continue its stroke for cutting off the wire, and forming, driving and clenching the staple.

Another object of the invention is to mount the head and spindle in such manner that they can be rotatably adjusted in their support and can be readily removed therefrom, together with the wire feed mechanism, without dismembering the latter.

In the accompanying drawings, consisting of two sheets: Figure 1 is an elevation of a stapling mechanism embodying this invention and showing the head and spindle in their normal raised position. Fig. 2 is a similar elevation showing the parts viewed from the opposite side. Fig. 3 is a similar elevation showing the head and spindle in the position in which the head has been lowered upon the pamphlet resting on the anvil. Fig. 4 is a detached side elevation, on an enlarged scale, of the ratchet mechanism by which the feed rolls are actuated. Fig. 5 is a detached sectional plan view, in line 5—5, Fig. 1, on an enlarged scale.

Like reference characters refer to like parts in the several figures.

A represents the stationary supporting arm, B the vertically movable stapling head, C a guide sleeve for the head supported in the end of the arm, D the vertically movable stapling spindle arranged in the head, extending above and below the same and provided with the usual implements for cutting the wire and forming, driving and clenching the staple, E the lever which actuates the head and spindle and is connected with the upper end of the spindle and pivoted intermediate its length to the arm A, F the pedal, G the rod connecting the same with the lever E, H the return spring, I the anvil, and K the work resting thereon.

The head B slides vertically in the guide sleeve C and the latter is rotatably mounted in a bearing 10 formed in the end of the arm A, in which the sleeve is held against vertical displacement by flanges 11 12 bearing, respectively, against the upper and lower sides of the arm. The outer or front portion of this bearing is formed by a removable cap 13 which is secured to the arm by thumb-screws 14 so that it can be readily secured in position or removed. The sleeve can be turned in this bearing and is coupled with the head by a tongue 15 depending from the lower flange 12 of the sleeve and extending through a notch 16 in a flange 17 which is formed on the head below the sleeve and limits the upward movement of the head. The notch 16 maintains the head in engagement with the tongue 15 in all positions of the head and compels the head to turn with the sleeve. The latter can be turned in the bearing of the supporting arm when necessary for adjusting the stapling head and the mechanism connected therewith so as to insert the staples into the pamphlets or other article in the desired position. When the sleeve has been adjusted it is clamped in position by means of the screws 14.

The upper end of the spindle is connected with the actuating lever E in such manner that it is readily removable therefrom in a forward direction, this being the direction in which the sleeve and head are removable from the supporting arm A. For that purpose the lever is constructed with a bifurcated end 20 which embraces a bifurcated collar 21 connected by lateral pivots 22 with the lever E. This collar straddles the upper reduced neck 23 of the spindle which is provided above this collar with a washer 24 and screw nuts 25. Upon loosening these nuts and removing the cap 13 from the arm A, the stapling head B and the spindle D can be removed together without disarranging the feed mechanism carried by these parts.

The wire feed mechanism is carried by a bracket 30 which is secured to the lower portion of the head B and moves up and down with the same. 31 and 32 are the feed rollers by which the wire 33 is fed to the head at 34, Figs. 1 and 2. The wire is unwound from a reel 35 which is journaled in an arm 36 secured to the lower portion of the sleeve C and passes from the reel over a guide 37 to the rollers 31 32 and thence through a guide 38 to the head B.

The stationary feed roller 31 is secured to a shaft 40 which is journaled in the bracket 30 and provided on one side of the bracket with a gear wheel 41 which meshes with a wheel 42 secured to the movable roller 32 for driving the latter. The roller 32 is movable toward and from the roller 31 and is for that purpose journaled in the forked end of a curved lever 43 which is supported on the bracket 30 by a pivot 44. This lever is pressed by a spring 45, seated in the bracket 30, in the proper direction to press the roller 32 carried by this lever against the roller 31 journaled in the bracket. The spring 45 bears against an adjusting screw 46 in the upper arm of the lever 43. The latter is provided with a cam lever 47 which can be engaged against the bracket 30 in such manner as to hold the movable roller 32 away from the stationary roller 31, when the feeding action is to be suspended.

The shaft 40 of the stationary roller 31 is provided on the opposite side of the bracket with a ratchet mechanism by which this shaft is so actuated for every completed working stroke of the stapling spindle that the rollers 31 and 32 feed to the head the length of wire required for forming a staple. This ratchet mechanism is constructed as follows: 50 represents an upright rack bar which is secured at its upper end to the lower portion of the stapling spindle D and extends downwardly from the same, meshing with a gear wheel 51 which turns on a stud 52 secured to the side of the bracket 30. This rack bar moves down and up with the stapling spindle and turns the wheel 51 alternately in opposite directions. This wheel meshes with a gear sector or mutilated gear 53 which is loosely mounted on the shaft 40 of the stationary roller 31 and provided with an arm 54 to which is pivoted a feed pawl 55 which engages a ratchet wheel 56 secured to said shaft, so that by the forward movement of the feed pawl, which takes place during the downward movement of the spindle D and its rack bar 50, the shaft is given a partial forward rotation. This feed pawl is held in engagement with the ratchet wheel by a spring 57 secured to the arm 54. The pawl is disengaged from the ratchet wheel, when the length of wire for forming a staple has been fed out, by a stationary cam 58 which is supported on one side of the ratchet wheel and secured to any suitable support. The feed pawl is provided on its side with a stud or roller 59 which rides on the face of this cam, and this face is so shaped that it causes the pawl to engage the ratchet wheel in the initial position of the pawl, shown in full lines in Fig. 4, and allows the pawl to remain in engagement with the ratchet wheel long enough to produce a feed movement of the required extent, while it lifts the pawl out of engagement with the ratchet wheel when the required feed movement has been performed, leaving the pawl free to continue its forward movement out of engagement with the ratchet wheel and without further turning the latter or the feed rollers. For this purpose the face of the cam is provided with a depressed portion 60 and a following raised portion 61. The depressed portion permits the pawl to engage the ratchet wheel and turn the same forwardly, thereby turning the feed rollers, while the raised portion 61, by engagement with the stud or roller 59, carries the pawl clear of the ratchet wheel. In passing from the depressed portion 60 to the raised portion 61 the stud or roller 59 lifts the pawl out of engagement with the ratchet wheel, whereby the further rotary actuation of the ratchet wheel and the rotation of the feed rollers are stopped, while the pawl can continue its forward movement out of engagement with the ratchet wheel, during which movement the stud or roller rides on the raised portion of the cam, as represented by dotted lines in Fig. 4.

If an incomplete depression is imparted to the spindle the feed pawl is partly advanced thereby and effects a partial feed movement of the ratchet wheel and feed rollers, and on the pedal being released the pawl returns to its initial position. At the next depression of the spindle no further feed is effected until the pawl again comes into contact with the tooth with which it had been previously engaged and if the depression is a complete one the remaining portion of the feed movement will be imparted to the pawl and by the latter to the ratchet wheel and the feed will be the same as though a complete depression had been imparted to the spindle in the first instance.

The herein described feed mechanism actuates the feed rollers until they have fed out the length of wire which is required for a staple and then automatically becomes disengaged and permits the spindle to continue its operative stroke for cutting off the wire and forming, driving and clenching the staple without further actuating the feed mechanism, and in the event of one or more incomplete depressions being imparted to the spindle, the partial feed effected thereby will be supplemented and converted into a complete feed at the next complete depression of the spindle.

I claim as my invention:

1. In a stapling machine, the combination with a reciprocating head and a reciprocating stapling spindle which has a movement relative to said head, of a feed mechanism for the wire carried by said head, an actuating device for said feed mechanism connected to said spindle, a bearing in which said head and spindle are guided and from which they are removable laterally, and an operating device for said spindle to which the spindle is detachably connected, the removal of said head and spindle from said bearing disengaging said spindle from its actuating device, substantially as set forth.

2. In a stapling machine, the combination with a reciprocating head and a reciprocating stapling spindle which has a movement relative to said head, of a feed mechanism for the wire carried by said head, an actuating device for said feed mechanism connected to said spindle, a bearing in which said head and spindle are guided and from which the head and spindle, together with the wire feed mechanism carried by the head are removable laterally as a unit, and an operating device for said spindle from which the spindle is adapted to be disengaged by the removal of the spindle and head from said bearing, substantially as set forth.

3. In a stapling machine, the combination with a reciprocating head and a reciprocating stapling spindle, of feed rollers for the wire, a ratchet wheel connected with one of said feed rollers, a feed pawl adapted to move back and forth over said ratchet wheel, a stationary cam controlling said pawl and provided with a face portion which permits said pawl to engage said ratchet wheel and with another face portion which carries said pawl clear of said ratchet wheel, said feed rollers, ratchet wheel, pawl and cam being carried by said reciprocating head, and a rack connected to said spindle and geared to said feed pawl, substantially as set forth.

4. In a stapling machine, the combination with an upright reciprocating head containing a stapling spindle, of a stationary support for said head and spindle having a bearing in which said head is capable of rotary adjustment, and means for holding the head in its adjusted position, said head and spindle being removable laterally as a unit from said bearing, substantially as set forth.

5. In a stapling machine, the combination with an upright reciprocating head containing a stapling spindle, of a stationary support for said head and spindle having a bearing, a guide sleeve for said head capable of rotary adjustment in said bearing, and means for compelling said head to turn with said sleeve while permitting said head to move axially therein, said reciprocating head and spindle together with said guide sleeve being removable laterally as a unit from said bearing, substantially as set forth.

6. In a stapling machine, the combination with an upright reciprocating head and a stapling spindle arranged therein, of a stationary support for said head and spindle provided with a removable portion which permits said head and spindle to be removed laterally, and an actuating lever for said spindle having a bifurcated end which engages the upper end of the spindle and permits the removal of the spindle from said lever in the same direction in which the head is removable from the support, substantially as set forth.

Witness my hand in the presence of two subscribing witnesses.

CHARLES DUNCAN MACKAY.

Witnesses:
 DAISY GOBBETT,
 JAMES CARTER.